UNITED STATES PATENT OFFICE.

DANIEL TYRER, OF STOCKTON, ENGLAND.

MANUFACTURE OF PHENOL.

1,210,726.  Specification of Letters Patent.  Patented Jan. 2, 1917.

No Drawing.  Application filed May 22, 1916. Serial No. 99,253.

*To all whom it may concern:*

Be it known that I, DANIEL TYRER, a subject of the King of Great Britain, residing in Stockton-on-Tees, England, have invented a certain new and useful Manufacture of Phenol, of which the following is a specification.

The usual process for the manufacture of phenol from benzenemonosulfonic acid involves the use, as auxiliary materials, of lime, sodium carbonate, caustic soda and an acid, generally sulfuric acid.

The present invention consists in a process wherein lime and sodium bisulfate (niter cake) are the auxiliary materials, the several operations being so conducted that the products or by-products of some are used in others.

As in the known process, the manufacture starts with a mixture of benzenemonosulfonic acid and sulfuric acid obtained by heating benzene with strong sulfuric acid. It will be convenient to consider the various operations as constituting stages of the process.

*Stage 1.*—The hot mixture of acids from the sulfonation pot (which, if the sulfonation has been conducted as described in my co-pending application for U. S. Letters Patent Serial No. 99,252, may contain 85 per cent. of benzene-sulfonic acid, 13 per cent. of sulfuric acid and 2 per cent. of water) may be treated directly with calcium carbonate as described below or the sulfuric acid in it may first be recovered in large part by cooling the mixture and separating by filtration or otherwise the solidified sulfonic acid from the liquid sulfuric acid. The recovered sulfuric acid is returned to the sulfonation process. The sulfonic acid (or the mixture of sulfonic and sulfuric acids) is transferred to a tank containing water and the requisite quantity of calcium carbonate in the form of ground limestone is added to realize the equation:—

$$2C_6H_5SO_3H+CaCO_3= \\ (C_6H_5SO_3)_2Ca+CO_2+H_2O$$

and, so far as there is sulfuric acid present, the equation:—

$$H_2SO_4+CaCO_3=CaSO_4+CO_2+H_2O$$

Limestone is used here only in starting the process or as an addition to make good losses during working. Normally a mixture consisting substantially of calcium carbonate and calcium sulfite obtained as a by-product of stage 5 is used, the calcium sulfite also neutralizing the sulfonic acid according to the equation:—

$$2C_6H_5SO_3H+CaSO_3= \\ (C_6H_5SO_3)_2Ca+SO_2+H_2O$$

The whole is agitated until the solution has become neutral and the escaping gases are pumped away for use in stage 4.

*Stage 2.*—To the liquid containing calcium benzenesulfonate in solution and some calcium sulfate in suspension, is added a solution of sodium sulfate, which, after starting, is a product of stage 6. The liquid now becomes a solution of sodium benzenesulfonate, calcium sulfate being precipitated:—

$$(C_6H_5SO_3)_2Ca+Na_2SO_4= \\ 2C_6H_5SO_3Na+CaSO_4$$

*Stage 3.*—The liquid from stage 1 is filtered or otherwise separated from the calcium sulfate and to it is added a solution of caustic soda, which, after starting, is produced in stage 5, in the ratio of about 3 molecular proportions to 1 molecular proportion of sodium benzenesulfonate present in the solution. The mixture is evaporated to dryness and the dry mass is fused. The caustic soda decomposes the sulfonate forming the sodium salt of phenol and sodium sulfite:—

$$C_6H_5SO_3Na+2NaOH= \\ C_6H_5ONa+Na_2SO_3+H_2O$$

This method of boiling down together the sodium benzenesulfonate and caustic soda solutions is cheaper and more convenient than the usual method consisting in first making dry sodium benzenesulfonate and then fusing this with solid caustic soda, for it avoids the necessity of making solid caustic; moreover, it gives better results in a shorter time, for it insures perfect mixing of the two substances, which mixture has merely to be heated until it fuses.

*Stage 4.*—The melt obtained in stage 3, consisting of a mixture of sodium phenolate, sodium sulfite and unchanged caustic soda, is dissolved in hot water and the liquor is charged into a tank into which the acid gases obtained in stage 1 by neutralizing the benzenesulfonic acid and in stage 6, which gases consist of carbon dioxid containing some sulfur dioxid, are passed, care being taken to distribute the gas through the liquid as much as possible, as by passing it beneath a perforated false bottom in the tank. The acid gases liberate the phenol from the sodium phenolate and convert the unchanged caustic soda into sodium carbonate and sodium sulfite:—

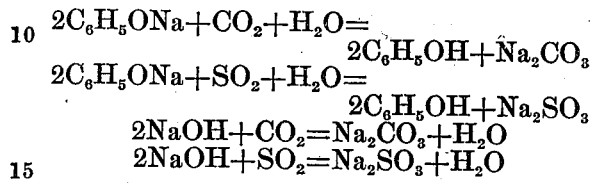

The phenol collects as an oil on the surface of the liquid and is drawn off and purified in any known manner. The mother liquor is a solution of sodium carbonate and sodium sulfite.

*Stage 5.*—This mother liquor is then boiled in a suitable boiler with milk of lime containing sufficient lime to convert the sodium carbonate and the greater part of the sodium sulfite into caustic soda, that is to say, an amount of lime in excess (say 25 per cent. of a molecular proportion) of that represented by the equations:—

$$Na_2CO_3 + Ca(OH)_2 = 2NaOH + CaCO_3$$
$$Na_2CO_3 + Ca(OH)_2 = 2NaOH + CaCO_3$$

When the reaction is complete, the liquor is allowed to settle. The clear solution of the liquor is drawn off and transferred to a tank from which it is added to the solution of sodium benzenesulfonate in stage 3.

*Stage 6.*—Half the sediment, consisting of calcium carbonate, calcium sulfite and excess of lime, is removed and is used in stage 1 for neutralizing the benzenesulfonic acid. To the other half, remaining in the boiler, is added a solution of niter cake containing sufficient $NaHSO_4$ to convert the calcium carbonate, calcium sulfite and lime into sulfate, liberating carbon dioxid and sulfur dioxid, that is to say to realize the equations:—

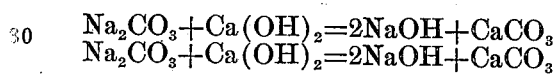

The mixture of gases is used, as already stated, in stage 4, and the solution of sodium sulfate left in the boiler is filtered from the calcium sulfate and used in stage 2 for converting the calcium benzenesulfonate into the sodium salt.

It will be seen that the process requires calcium carbonate for stage 1, sodium sulfate for stage 2, caustic soda for stage 3, and carbon dioxid for stage 4. The carbon dioxid is supplied by an initial purchase of limestone and if the process could be worked without loss no further supply would be required. The sodium sulfate and caustic soda are supplied by a continuous purchase of lime and niter cake. The lime (except an amount corresponding with the limestone originally purchased, which remains in the process) and the sulfuric acid radical of the niter cake are waste products in the form of calcium sulfate. Of the sodium of the niter cake an initial quantity remains in the process while the rest is removed in the form of sodium sulfite or bisulfite, the sulfur in this being that in the benzenesulfonic acid operated upon.

As has been seen, the sulfur dioxid can to some extent take the place of carbon dioxid, but not wholly, because of the difficulty of completely causticizing sodium sulfite. It is more economical to make good loss of carbon dioxid by purchasing limestone and to pass the acid gases from stages 1 and 6 through a part of the mother liquor of stage 4 until the whole of the sodium carbonate therein has become sodium sulfite or bisulfite:—

$$Na_2CO_3 + SO_2 = Na_2SO_3 + CO_2$$
$$Na_2CO_3 + 2SO_2 + H_2O = 2NaHSO_3 + CO_2$$

The carbon dioxid evolved is used in stage 3 and the solution of sodium sulfite or bisulfite is crystallized for market.

I am aware that the usual process for converting benzenemonosulfonic acid into phenol involves its conversion first into the calcium salt, then into the sodium salt, then fusion of the latter with caustic soda and finally treatment of the sodium phenolate with an acid. My invention resides in so selecting the reactions and combining the operations that lime and niter cake are the only auxiliary materials continuously introduced.

Having thus described my invention and the best means I know of carrying the same into practical effect, I claim:—

1. In a process of making phenol from benzenemonosulfonic acid, the step which consists in treating calcium benzenesulfonate with normal sodium sulfate to obtain sodium benzenesulfonate.

2. In a process of making phenol from benzenemonosulfonic acid the steps which consist in making normal sodium sulfate by treating a mixture of calcium carbonate and calcium sulfite with sodium bisulfate and in treating with the normal sodium sulfate thus obtained calcium benzenesulfonate so as to obtain sodium benzenesulfonate.

3. In a process of making phenol from benzenemonosulfonic acid the steps which consist in making normal sodium sulfate by treating calcium carbonate with sodium bisulfate and in treating with the normal sodium sulfate thus obtained calcium benzenesulfonate so as to obtain sodium benzenesulfonate.

4. In a process of making phenol from benzenemonosulfonic acid the combination of steps consisting in fusing a benzene monosulfonate with caustic soda, treating the melt with carbon dioxid, causticizing with lime the mixture of sodium carbonate and sulfite thus produced and treating with sodium bisulfate the mixture containing calcium carbonate and sulfite made by the causticizing.

5. In a process of making phenol from benzenemonosulfonic acid, the combination of steps consisting in treating with sodium bisulfate a mixture containing calcium carbonate and sulfite so as to obtain acid gases and normal sodium sulfate, passing the said acid gases through a solution of a melt made by fusing sodium benzenesulfonate with caustic soda, so as to obtain a solution of sodium carbonate and sulfite, treating calcium benzenesulfonate with the said normal sodium sulfate so as to obtain sodium benzenesulfonate, and causticizing with lime the said solution of sodium carbonate and sulfite so as to obtain caustic soda and a mixture containing calcium carbonate and calcium sulfite.

6. A process of making phenol from benzenemonosulfonic acid which process consists in (1) neutralizing benzenemonosulfonic acid with a mixture containing calcium carbonate and sulfite from (5) so as to obtain calcium benzenesulfonate and acid gases; (2) treating the calcium benzenesulfonate with normal sodium sulfate from (6) so as to obtain sodium benzenesulfonate; (3) fusing the sodium benzenesulfonate with caustic soda from (5) so as to obtain a mixture of sodium phenolate and sodium sulfite; (4) passing acid gases from (1) and (6) through a solution of the mixture of sodium phenolate and sodium sulfite so as to obtain phenol and a solution of sodium carbonate and sulfite; (5) causticizing the solution of sodium carbonate and sulfite with lime so as to obtain caustic soda and a mixture containing calcium carbonate and sulfite; and (6) treating part of the mixture of calcium carbonate and sulfite with sodium bisulfate so as to obtain normal sodium sulfate and acid gases.

7. In a process of making phenol from benzenemonosulfonic acid the combination of steps consisting in treating with sodium bisulfate a mixture containing calcium carbonate and sulfite, passing the acid gases thus produced through a solution containing sodium carbonate so as to obtain a sodium sulfite and carbon dioxid, passing this carbon dioxid through the solution of a melt made by fusing sodium benzenesulfonate with caustic soda, and causticizing with lime the solution of sodium carbonate and sulfite thus produced.

8. A process of making phenol from benzenemonosulfonic acid which process consists in (1) neutralizing benzenemonosulfonic acid with a mixture containing calcium carbonate and sulfite from (5) so as to obtain calcium benzenesulfonate and acid gases; (2) treating the calcium benzenesulfonate with normal sodium sulfate from (6) so as to obtain sodium benzenesulfonate; (3) fusing the sodium benzenesulfonate with caustic soda from (5) so as to obtain a mixture of sodium phenolate and sodium sulfite; (4) passing carbon dioxid from (7) through a solution of the mixture of sodium phenolate and sodium sulfite so as to obtain phenol and a solution of sodium carbonate and sulfite; (5) causticizing part of the solution of sodium carbonate and sulfite with lime so as to obtain a mixture containing calcium carbonate and sulfite and caustic soda; (6) treating part of the mixture of calcium carbonate and sulfite with sodium bisulfate so as to obtain normal sodium sulfite and acid gases; and (7) passing the acid gases and those from (1) into part of the solution of sodium carbonate and sulfite from (3) so as to obtain a solution of a sodium sulfite and carbon dioxid.

9. In the manufacture of phenol wherein sodium benzenesulfonate is fused with caustic soda to produce sodium phenolate which is decomposed by an acid, the combination of steps which consist in treating sodium bisulfate with calcium compounds so that it supplies part of the necessary acid and the soda and removes the sulfur of the sodium benzene sulfonate as a sodium sulfite.

In testimony whereof I have signed my name to this specification in the presence of two subscribing witnesses.

DANIEL TYRER.

Witnesses:
 B. BEAT,
 ARTHUR G. BAKER.